(12) United States Patent
Martino

(10) Patent No.: US 8,102,620 B2
(45) Date of Patent: Jan. 24, 2012

(54) ISOLATING AN EXCITATION-SENSITIVE COMPONENT BY ELASTIC WAVE REFLECTION

(75) Inventor: Peter Miguel Martino, Windham, NH (US)

(73) Assignee: Seagate Technology LLC, Cupertino, CA (US)

( * ) Notice: Subject to any disclaimer, the term of this patent is extended or adjusted under 35 U.S.C. 154(b) by 286 days.

(21) Appl. No.: 12/487,048

(22) Filed: Jun. 18, 2009

(65) Prior Publication Data
US 2010/0322054 A1     Dec. 23, 2010

(51) Int. Cl.
*G11B 33/08*     (2006.01)
*G11B 5/55*      (2006.01)

(52) U.S. Cl. ............... 360/97.02; 360/265.6; 720/651

(58) Field of Classification Search ............... 360/265.6, 360/266.1, 97.02, 97.03; 720/651, 692, 697, 720/698
See application file for complete search history.

(56) References Cited

U.S. PATENT DOCUMENTS

| | | | | |
|---|---|---|---|---|
| 4,682,255 A * | 7/1987 | Sleger et al. | ............... | 360/265.6 |
| 4,754,353 A * | 6/1988 | Levy | ............... | 360/265.6 |
| 5,214,549 A * | 5/1993 | Baker et al. | ............... | 360/97.02 |
| 5,483,398 A * | 1/1996 | Boutaghou | ............... | 360/97.02 |
| 5,598,306 A * | 1/1997 | Frees et al. | ............... | 360/97.02 |
| 5,625,511 A * | 4/1997 | Brooks et al. | ............... | 360/99.08 |
| 5,732,063 A * | 3/1998 | Chen | ............... | 720/698 |
| 5,978,180 A * | 11/1999 | Lee et al. | ............... | 360/265.6 |
| 6,377,420 B1 * | 4/2002 | Tadepalli et al. | ............... | 360/97.02 |
| 6,466,400 B1 * | 10/2002 | Iwahara et al. | ............... | 360/99.08 |
| 6,501,615 B1 * | 12/2002 | Kelsic et al. | ............... | 360/97.02 |
| 6,534,890 B2 * | 3/2003 | Rafaelof | ............... | 310/91 |
| 6,950,275 B1 * | 9/2005 | Ali et al. | ............... | 360/97.02 |
| 7,012,781 B2 * | 3/2006 | Chee et al. | ............... | 360/97.01 |
| 7,164,558 B2 * | 1/2007 | Jeong | ............... | 360/265.6 |
| 7,280,317 B1 * | 10/2007 | Little et al. | ............... | 360/265.6 |
| 7,352,536 B2 * | 4/2008 | Kim | ............... | 360/265.6 |
| 7,529,062 B2 * | 5/2009 | Xu | ............... | 360/97.02 |

* cited by examiner

*Primary Examiner* — Brian Miller
(74) *Attorney, Agent, or Firm* — Mitchell K. McCarthy

(57) ABSTRACT

An apparatus and associated method for reflecting elastic waves that propagate from an excitation source to an excitation-sensitive component in a device. The device has an enclosure with a base constructed of a first metal. An elastic wave reflector is constructed of a different second metal and is operably affixed to the base. The elastic wave reflector defines a support surface to which the excitation-sensitive component is operably affixed within the enclosure.

20 Claims, 2 Drawing Sheets

ISOLATING AN EXCITATION-SENSITIVE COMPONENT BY ELASTIC WAVE REFLECTION

FIELD

The present embodiments relate generally to device structures and more particularly, but without limitation, to construction features and methods that serve to reflect elastic waves away from an excitation-sensitive component in a device.

BACKGROUND

With the proliferation of processor-based electronics into virtually all consumer products, and with the evolution with which they have become ever more portable and data storage intensive, the adverse effects of excitation forces acting on electronic components comes to the forefront as an issue that must be effectively addressed.

Besides the relatively large-scale excitation forces that have been addressed by prior solutions to various degrees of success, there is newfound awareness that of like concern are relatively small-scale, short-duration, and high-speed elastic waves that propagate from an impulse force throughout an enclosure. The source of these elastic waves come as the result of subtle physical activity, such as caused by thermal expansion, residual stresses, fissures or cracks in the material, and the like. A common example of a manifestation of these impulse forces is the faint ticking that can be heard from the engine compartment of an automobile after it is turned off.

The elastic waves propagating from these impulses in some instances can no longer be ignored for being negligible in regard to their impact on the operation of the device. It is to novel and unobvious improvements in the art for shielding an excitation-sensitive component from such elastic waves that the present embodiments are directed.

SUMMARY

The present embodiments are generally directed to an enclosure for a device.

In some embodiments an enclosure has a base constructed of a first metal and an elastic wave reflector constructed of a different second metal that is operably affixed to the base. The elastic wave reflector defines a support surface to which an excitation-sensitive component is operably affixed within the enclosure.

In some embodiments an enclosure for a data storage device is provided. The enclosure has a base constructed of a first material and an elastic wave reflector constructed of a different second material that is operably affixed to the base. The elastic wave reflector defines a support surface to which an actuator assembly is operably affixed within the enclosure.

In some embodiments a method is provided for attenuating elastic waves propagated to an excitation-sensitive component in a device. The method includes a step of obtaining an enclosure that has a base constructed of a first metal and has an elastic wave reflector constructed of a different second metal that is operably affixed to the base, wherein the elastic wave reflector defines a support surface. The method also includes a step of affixing the excitation-sensitive component to the support surface.

DETAILED DESCRIPTION

The embodiments of the present invention generally encompass an apparatus and associated methodology for attenuating resonance created by the propagation of elastic waves in a device that has an excitation-sensitive component. Generally, an elastic wave reflector is included in the device that reflects the elastic waves away from the excitation-sensitive component.

In the illustrative embodiments the elastic wave reflector is included as part of an enclosure and supports an excitation-sensitive component in the form of an actuator assembly that includes a data transfer member. Without the elastic wave reflector, elastic waves propagate to the data transfer member and create servo positioning errors. The disclosed application, as being used in a data storage device, is merely illustrative and not limiting of the scope of the claimed embodiments of the present invention.

Figure 1:
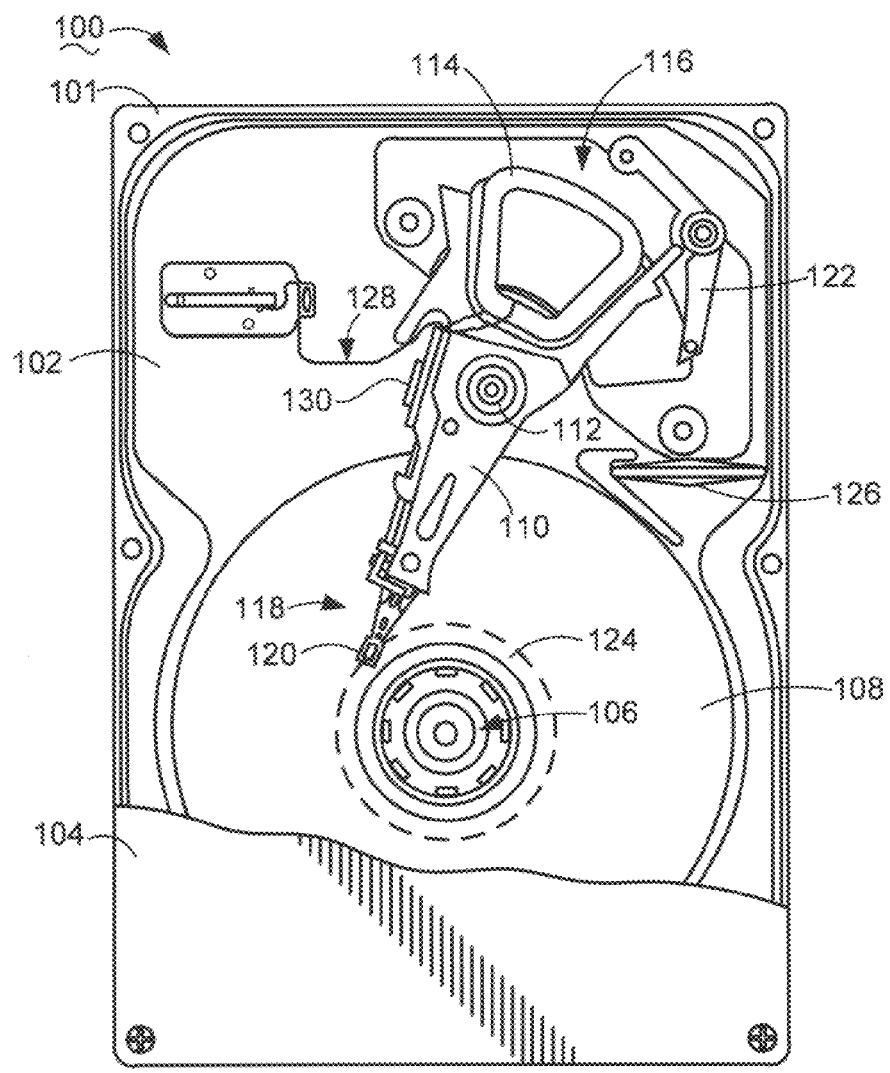
FIG. 1 is a top view of a device that is constructed in accordance with related art embodiments.

In order to set forth a detailed description of various embodiments of the present invention, reference is first made to FIG. 1 which depicts a related art device in the form of a disc drive 100 that is used to store computer data. Although the disc drive 100 is used for purposes of the following description, the claimed embodiments are not so limited. The elastic wave reflecting embodiments described herein can be employed advantageously in a multitude of different devices, such as but not limited to tiny machines like micro-electro-mechanical devices (MEMS) and nano-electro-mechanical devices (NEMS). Alternatively, embodiments of the present invention can be employed in other macroscopic devices, such as optical storage devices, tape devices, hybrid devices, and the like. An enumeration of all such types of devices suited for use in practicing the claimed embodiments is not necessary for the skilled artisan to understand the scope of the claimed subject matter.

The disc drive 100 includes a head-disc assembly (HDA) 101 and a printed wiring assembly (PWA) supporting control electronics used by the disc drive 100. The PWA includes a printed circuit board (PCB) that is mounted to the underside of the HDA 101 and so is not visible in the top view of FIG. 1.

The HDA 101 includes a base 102 to which various disc drive components are mounted. A top cover 104, shown in partial cutaway fashion, cooperates with the base 102 to form a sealed housing for containing components of the HDA 101. A spindle motor 106, supported by the base 102, rotates one or a plurality of discs 108 at a constant high speed during normal disc drive operation.

To access the discs 108, a controllably positionable actuator assembly includes a cartridge bearing 112 supported by the base 102, upon which an actuator 110 (sometimes referred to as "e-block") is journalled for rotation. The actuator 110 is selectively rotatable in response to currents applied to a coil 114 of a voice coil motor (VCM) 116. A plurality of flexible suspensions 118 extend to support a corresponding plurality of read/write heads 120 adjacent respective storage surfaces of the discs 108. The heads 120 are positionably located over data tracks of the discs 108 in order to read data from and write data to the tracks, respectively.

An inertial latch 122 latches the actuator 110 when the disc drive 100 is deactivated so that the heads 120 are brought to rest upon texturized landing zones 124 near the innermost diameters of the discs 108. A re-circulation air filter 126 filters out airborne particulate contamination as fluid within the housing is channeled from the rotating discs 108 to cool the actuator coil 114.

A flex circuit 128 facilitates electrical communication between the actuator 110 and the disc drive PWA. The flex circuit 128 includes a preamplifier/driver circuit 130 which applies read bias and write currents to the heads 120.

Figure 2:
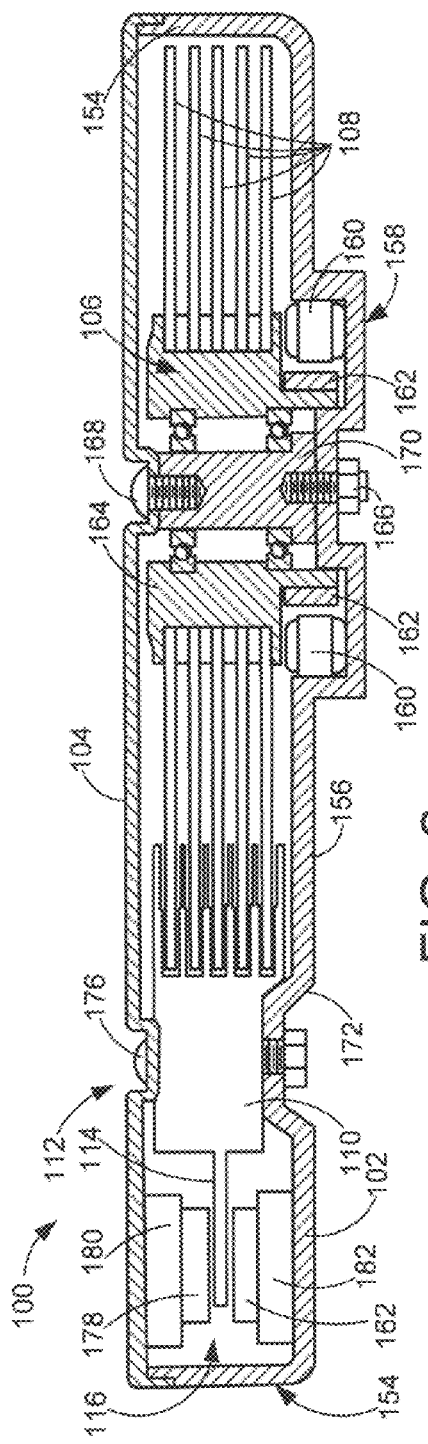
FIG. 2 is a cross sectional view of the device of FIG. 1.

FIG. 2 depicts a cross-sectional, elevational view of the disc drive 100 of FIG. 1. It will be noted that the aforementioned PCB has been omitted from FIG. 2 for purposes of clarity of illustration, but it will be recognized that the PCB is mounted externally to the surface of the base 102. As shown in FIG. 2, the base 102 includes generally vertical side walls 154 and a generally horizontal portion 156. The top cover 104 engages with the side walls 154 as shown to form the requisite sealed environment for the disc drive 100.

The horizontal portion 156 of the base 102 supports the spindle motor 106 and the actuator assembly. More particularly, a boss (or "embossment") 158 is provided in the horizontal portion 156 to accommodate a plurality of stationary coils (or stator) 160 of the spindle motor 106. Permanent magnets 162 are mounted to a rotatable hub (or rotor) 164 of the spindle motor 106. The discs 108 are fixed in rotation with the hub 164, which is journalled for rotation via a number of ball bearings. Thus, as will be recognized by those skilled in the art, the coils 160 are selectively energized to generate magnetic fields which interact with the magnetic fields of the permanent magnets 162 in order to rotate the discs 108 in the desired direction and at the desired speed. Fastener members 166, 168 are applied to secure a spindle motor shaft 170 to the base 102 and the top cover 104, respectively. More particularly, the fastener member 166 comprises an internally threaded nut that engages an externally threaded portion of the spindle motor shaft 170 extending through the base 102. Fastener member 168 comprises an externally threaded screw that engages an internally threaded aperture in the spindle motor shaft 170 to secure the top cover 104 to the spindle motor shaft 170.

Additionally, the horizontal portion 156 of the base 102 abuts another boss 172{,} which provides part of the supporting attachment of the actuator 110. More particularly, a fastener 176 secures the cartridge bearing 112 between the base 102 and the top cover 104.

Again, the actuator 110 rotates about the cartridge bearing 112 in accordance with the operation of the VCM 116, which entails selectively energizing the actuator coil 114 while it is sandwiched between opposing magnets 162, 178 that are supported by plates 182, 180, respectively. It will be recognized that in this manner a magnetically permeable flux path is established to complete the magnetic circuit of the VCM 116, but for purposes of illustration, this flux field has not been depicted in FIG. 2. When controlled DC current is passed through the actuator coil 114, an electromagnetic field is set up which interacts with the magnetic circuit of the VCM 116 to cause the actuator coil 114 to move relative to the permanent magnets 162, 178. As the actuator coil 114 moves, the actuator 110 pivots about the cartridge bearing 112. This causes the actuator 110 to rotate in the desired direction at the desired speed.

In this manner, the heads 120 are precisely positioned with respect to desired data storage tracks of the discs 108. A grouping of tracks from different stacked discs 108 at a common radial track location is referred to as a "cylinder" position. An excitation can create perturbations that disrupt the intended steady-state positional relationship of the heads 120 with respect to a desired cylinder. Clearly, some external excitation events, such as those caused by dropping a laptop computer in which the disc drive 100 resides, can generate sufficient forces to displace the heads 120 away from the steady state position. However, much smaller magnitude excitations must be addressed as well such as those created by the outwardly spiraling fluid flow created by the spinning discs 108 and those created by the high speed motor and load. Even smaller magnitude excitations that could once be ignored as negligible must now be addressed due to factors associated with the relatively higher areal density with which data is stored and the demand for high data throughput performance to and from the discs 108.

An example of the latter phenomenon is the excitation created by small, short-duration, impulsive forces that naturally occur in the metal components of a disc drive. These forces can be created by such phenomena as thermal expansion and contraction, residual stresses in the metals, discontinuities in the metals such as tiny cracks and fissures, and the like. These impulses propagate elastic waves that spread from the origin throughout the metal parts in the disc drive 100. As seen in FIG. 2 this means that an elastic wave existing in the base 102 will propagate eventually to the heads 120 by transmitting through the boss 172, the cartridge bearing 112, and then the actuator 110 that supports the heads 120. The claimed embodiments shield the actuator 110 from the propagation of these elastic waves by reflecting the elastic waves away from the actuator 110.

An impulse force of concern will generally propagate two types of elastic waves, longitudinal waves and shear waves. Shear waves oscillate in directions normal to the direction of propagation, like ripples spreading in water. Longitudinal waves oscillate along the direction of propagation, and are essentially sound waves traveling in a solid. The speed of longitudinal waves ($C_0$) is directly related to the metal's modulus of elasticity (E) and inversely related to the material's density ($\rho$):

$$C_0 = \sqrt{\frac{E}{\rho}}$$

Typically, aluminum is the material of choice in the disc drive industry for constructing the base 102. It could be argued that constructing the base 102 of brass could be advantageous in minimizing the effects of elastic waves because brass is roughly three times as dense as aluminum. However, such a solution is cost-prohibitive.

The speed of shear elastic waves is more complicated, being not only related to the metal's characteristic material properties but also being related to the dimensions of the transmission member and the elastic wave frequency. Generally, the elastic waves propagate more slowly as the metal thickness is decreased, so it could be argued that reducing the metal thicknesses could be advantageous in minimizing the effects of elastic waves. However, the components typically found in a disc drive 100 have already gone through repeated iterations of design scrutiny with an eye on providing the requisite strength while minimizing size and cost. Further reductions in thickness in most all instances would sacrifice structural integrity.

Figure 3:
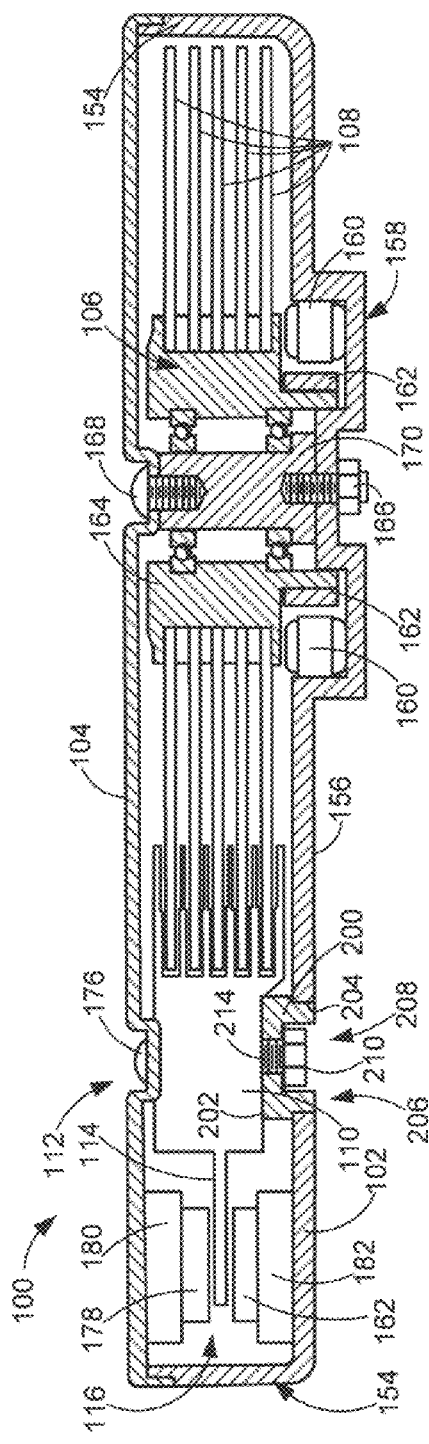
FIG. 3 is a cross sectional view similar to that of FIG. 2 but depicting a device that is constructed in accordance with embodiments of the present invention.

Another phenomenon of elastic waves is that they interact with sudden discontinuities in the metal in which they are propagating, such as changes in material properties and dimensions, by partly reflecting away from the discontinuity and thereby only partly transmitting into the discontinuity. For example, the change in amplitude between the transmitted waves and the reflected (incident) longitudinal waves when encountering a discontinuity can be computed in terms of:

$$\frac{amplitude_{transmitted}}{amplitude_{incident}} = \frac{2A_1\rho_1 c_2}{A_1\rho_1 c_1 + A_2\rho_2 c_2}\left(\frac{E_1 c_2}{E_2 c_1}\right)$$

where:
$E_1$ $E_2$=modulus of materials carrying incident (1) and transmitted (2) waves
$\rho_1$ $\rho_2$=density of materials carrying incident (1) and transmitted (2) waves
$c_1$ $c_2$=speed of sound in materials carrying incident (1) and transmitted (2) waves
$A_1$ $A_2$=area of members carrying incident (1) and transmitted (2) waves For shear waves the change in amplitude between the transmitted waves and the incident waves when encountering a discontinuity can be computed in terms of:

$$\frac{amplitude_{transmitted}}{amplitude_{incident}} = \frac{(2+2i)E_1 I_1 \gamma_1^3}{E_2 I_2 \gamma_2^2 \gamma_1 i + E_2 I_2 \gamma_2^3 i + E_1 I_1 \gamma_1^3 + E_2 I_2 \gamma_2^3}$$

where:
$\gamma_1$ $\gamma_2$=wave numbers of incident (1) and transmitted (2) waves
$I_1$ $I_2$=moment of inertia of members carrying incident (1) and transmitted (2) waves FIG. 3 is a view similar to FIG. 2 but depicting a disc drive 100' that is constructed in accordance with embodiments of the present invention. It is noted that the boss 172 in FIG. 2 is constructed of the same material as the rest of the base 102, such as aluminum. In the present embodiments, the boss 172 is advantageously replaced by an elastic wave reflector 200 that is constructed of a different material. Optimal materials for the elastic wave reflector 200 are those that have a characteristically high combination of density and modulus. For example, as discussed above, it would be advantageous to construct the elastic wave reflector 200 of tungsten or molybdenum, or to a lesser extent steel, in use with the aluminum base 102. Selectively constructing the elastic wave reflector 200 of a material with advantageous material properties and placing the elastic wave reflector in the propagation path between the excitation source and the excitation-sensitive component are key features of the present embodiments.

The skilled artisan will understand that the foregoing example of adding a discrete elastic wave reflector 200 to the base 102 is merely illustrative and not limiting of the claimed embodiments. In alternative equivalent embodiments, the elastic wave reflector can be unitarily formed with the base 102 or added to it, such as by a coating or sputtering process.

It is also noted that the elastic wave reflector 200 defines a support surface 202 at a distal end thereof that supportingly engages the actuator 110. The thickness of the elastic wave reflector 200 is significantly greater than that of the thickness of the base 102 at the portion thereof, including the edge 204 that defines an aperture 206 into which the elastic wave reflector 200 is operably inserted and there affixed to the base 102. This discontinuity in thicknesses creates yet another elastic wave reflecting feature that shields the excitation-sensitive actuator from elastic wave propagation.

In some embodiments the base 102 and elastic wave reflector 200 are joined together, such as by sizing the elastic wave reflector 200 to be press-fit into the aperture 206 and thus frictionally affixed to the base 102. Alternatively, without limitation, the elastic wave reflector 200 can be sized for adhering it into the aperture to affix it to the base 102.

Figure 4:
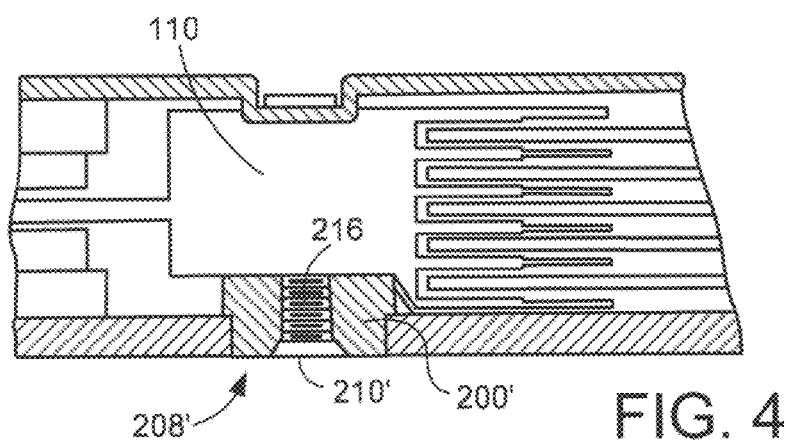
FIG. 4 is a cross sectional view depicting an elastic wave reflector constructed in accordance with alternative embodiments of the present invention.

The embodiments of FIG. 3 depict the plug 200 defining a longitudinal passage 208 into which an internally threaded fastener member (nut) 210 is operably admitted to affix the cartridge bearing 112 to the support surface 202 of the elastic wave reflector 200. In the illustrative embodiments of FIG. 3 the passage 208 is counterbore sized to recess the nut 210 to engage an externally threaded screw 214 admitted through the cover 104, the cartridge bearing 112, and the elastic wave reflector 200. In alternative equivalent embodiments (not shown), the cartridge bearing 112 can have an externally threaded fastener member portion extending therefrom that is operably admitted into the passage 208 in the same manner as the screw 214. In those embodiments, another fastener member (not depicted) could be used to affix the other end of the cartridge bearing 112 to the cover 104. In yet other alternative equivalent embodiments, the cartridge bearing 112 can be provided with an internally threaded opening that receivingly engages an externally threaded fastener member 216 admitted into the elastic wave reflector passage 208' depicted in FIG. 4 to affix the cartridge bearing 112 to the elastic wave reflector 200.'

The foregoing described embodiments employing threaded fastener members are merely illustrative and not limiting of the claimed embodiments. The threaded fasteners are described in the illustrative embodiments because they are useful for affixing the actuator 110 to the elastic wave reflector 200 and cover 104 adequately to withstand the high speed torques to which the actuator 110 are subjected during operation. In alternative equivalent embodiments, other types of fastener members, such as but not limited to an adhesive or an upset crimp, can be used in order to simplify manufacturing and decrease cost.

The apparatus described in the foregoing enables the skilled artisan to perform a method of attenuating elastic waves propagated to an excitation-sensitive component in a device in accordance with the present embodiments. The method includes obtaining an enclosure as described above in accordance with that depicted in FIG. 3. That is, the enclosure has a base that is constructed of a first metal. An elastic wave reflector that is constructed of a different second metal is operably affixed to the base, such as by press-fitting or adhering it as described. The method then includes supporting the excitation-sensitive component, such as the actuator 110 described above, on a support surface defined by the elastic wave reflector. A fastener member can be applied to affix the excitation-sensitive component to the elastic wave reflector.

The present embodiments therefore include unexpected and novel advantages as detailed herein and as can be further appreciated by the skilled artisan from the claims, figures, and description. Although some of the embodiments are described in reference to a data storage system, or even to a data storage device, the skilled artisan recognizes without enumeration that the claimed invention has various other embodiments with application to other devices as well that have excitation-sensitive components.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present embodiments, to the full extent indicated by the broad, general meaning of the terms in which the appended claims are expressed. It will be appreciated by those skilled in the art that the teachings of the present embodiments can be applied to a family of systems, devices, and means encompassed by and equivalent to the examples of embodiments described, without departing from the scope and spirit of the claimed embodiments. Further, still other applications for various embodiments, including embodiments not involving moving media storage but rather particularly pertaining to solid state data storage systems and hybrid storage systems, are included within the claimed embodiments.

What is claimed:

1. An enclosure for a device that has an excitation-sensitive component, the enclosure comprising:
    a base constructed of a first material characterized by a first material density; and
    an elastic wave reflector constructed of a different second material characterized by a second material density greater than the first material density, the second material operably contacting both the excitation-sensitive component and the base and otherwise spatially separating the excitation-sensitive component from the base to isolate the excitation-sensitive component from elastic waves propagating in the base.

2. The enclosure of claim 1 wherein the first material is characterized as a first metal and the second material is characterized as a different second metal.

3. The enclosure of claim 1 wherein the elastic wave reflector has a relatively greater thickness than a thickness of the base at a portion thereof to which the elastic wave reflector contactingly engages.

4. The enclosure of claim 1 wherein the base defines an aperture and the elastic wave reflector is sized to operably fill the base aperture.

5. The enclosure of claim 1 wherein the second material has a density that is at least twice the density of the first material.

6. The enclosure of claim 1 wherein the second material has a characteristically higher modulus of elasticity than the first material.

7. The enclosure of claim 1 wherein the excitation-sensitive component is an actuator operably supporting a data transfer member in relation to a medium in a data storage device.

8. The enclosure of claim 7 wherein the elastic wave reflector defines a passage sized to admit a fastener for operably affixing one end of a cartridge bearing to the elastic wave reflector, and wherein the actuator is journalled in rotation by the cartridge bearing.

9. The enclosure of claim 8 further comprising a cover that matingly engages with the base to form an enclosed space containing the actuator, wherein the cover defines an aperture configured to operably admit another fastener member to affix an opposing end of the cartridge bearing to the cover.

10. An enclosure for a data storage device having an excitation-sensitive actuator assembly, the enclosure comprising:
    a base constructed of a first material characterized by a first modulus of elasticity; and
    an elastic wave reflector constructed of a different second material characterized by a second modulus of elasticity greater than the first modulus of elasticity, the second material operably contacting both the actuator assembly and the base and otherwise spatially separating the actuator assembly from the base to isolate the actuator assembly from elastic waves propagating in the base.

11. The enclosure of claim 10 wherein the elastic wave reflector has a relatively greater thickness than a thickness of the base at a portion thereof to which the elastic wave reflector contactingly engages.

12. The enclosure of claim 10 wherein the base defines an aperture and the elastic wave reflector is sized to operably fill the base aperture.

13. The enclosure of claim 12 wherein the elastic wave reflector is sized to be adhered into the base aperture.

14. The enclosure of claim 10 wherein the second material has a characteristically higher density than the first material.

15. The enclosure of claim 10 wherein the second material has a modulus of elasticity that is at least twice the modulus of elasticity of the first material.

16. The enclosure of claim 10 wherein the elastic wave reflector defines a passage sized to admit a fastener member to operably affix the actuator assembly to the elastic wave reflector.

17. A method of attenuating elastic waves propagated to an excitation-sensitive component in a device, comprising:
    obtaining an enclosure that comprises:
        a base constructed of a first material characterized by a first density and by a first modulus of elasticity; and
        an elastic wave reflector constructed of a different second material characterized by at least one of a second density greater than the first density and a second modulus of elasticity greater than the first modulus of elasticity; and
    affixing the excitation-sensitive component to the second material, the second material operably contacting both the excitation-sensitive component and the base and otherwise spatially separating the excitation-sensitive component from the base to isolate the excitation-sensitive component from elastic waves propagating in the base.

18. The method of claim 17 wherein the excitation-sensitive component is characterized as an actuator operably supporting a data transfer member in relation to a medium in a data storage device.

19. The method of claim 18 wherein the affixing step comprises admitting a fastener member into a passage defined by the elastic wave reflector to affix one end of a cartridge bearing to the elastic wave reflector, wherein the actuator is journalled in rotation by the cartridge bearing.

20. The method of claim 19 further comprising joining a cover to the base to form an enclosed space containing the actuator, and admitting another fastener member into an aperture defined by the cover to affix an opposing end of the cartridge bearing to the cover.

* * * * *